Figure 1:
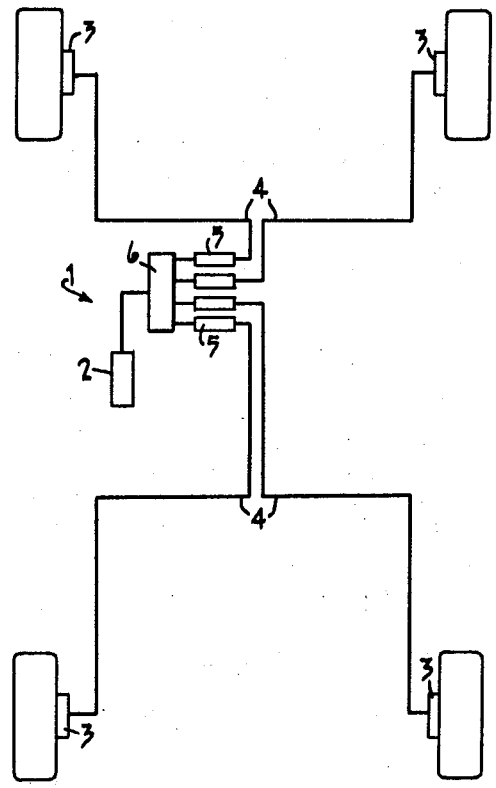

July 13, 1965 D. A. BOUCOUVALAS 3,194,018
SAFETY MECHANISM FOR HYDRAULIC BRAKES
Filed June 22, 1964 2 Sheets-Sheet 1

Inventor
Dimitri A. Boucouvalas
By Cushman, Darby & Cushman
Attorneys

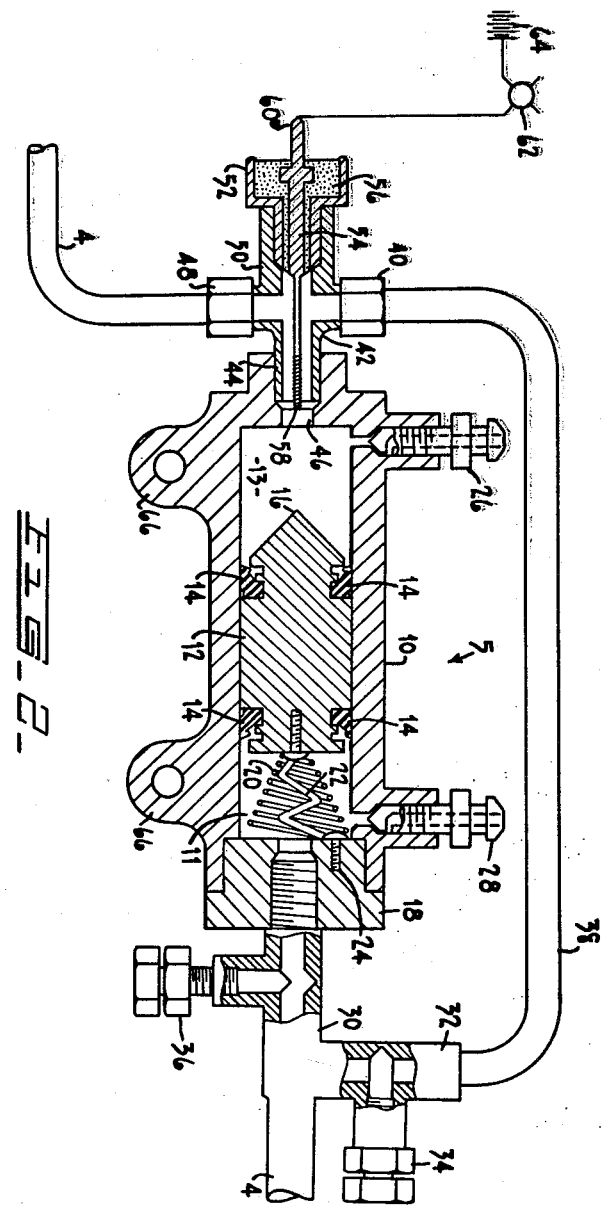

United States Patent Office 3,194,018
Patented July 13, 1965

3,194,018
SAFETY MECHANISM FOR HYDRAULIC BRAKES
Dimitri A. Boucouvalas, Corner of Main St. and Milner Road, Moncton, New Brunswick, Canada
Filed June 22, 1964, Ser. No. 377,017
Claims priority, application Greece, July 6, 1963, 24,852
1 Claim. (Cl. 60—54.5)

This invention relates to hydraulic braking systems on automobiles and like vehicles and in particular to a safety device for such systems.

The evolution of the hydraulic or fluid-operated brakes has played an important role in the development of the modern automobile. However, the changeover to hydraulic brakes from those of mechanical operation included some disadvantages from the point of view of safety. The main drawback in a hydraulic system is that one master cylinder serves as a pump for brake fluid being directed to brake cylinders on each wheel of the automobile with the result that a rupture or leak in any one brake line causes a negative pressure in all the lines and a complete failure of the brakes.

This problem has been obviated to a certain extent by several automotive firms such, for example, as Rolls-Royce who, for many years, incorporated a hydraulic system for the front wheels of their automobiles but, in case of hydraulic failure, they also include a mechanical braking system on the rear wheels. However, this system provided difficulties in adjustment and the like and has now been discontinued.

A normal hydraulic braking system includes a master cylinder having a piston therein including a pair of rubber piston cups or the like to prevent leakage of the fluid in the cylinder past the piston. The master cylinder is connected by brake line tubing to a plurality of wheel cylinders wherein the line from the master cylinder is connected to the wheel cylinder approximately centrally thereof. The ends of the wheel cylinders are provided with pistons again having rubber cups and each piston is connected to, or associated with, a brake shoe. Now a further disadvantage of such a hydraulic system is that if the automobile is not used continually, such as a long overlay in the winter, the sealing rubber cups in the wheel cylinders and master cylinder tend to shrink with disuse and a first brake application may result in failure. The above disadvantages are common to all systems using hydraulic fluid as a pressure medium such as drum brakes, disc brakes etc.

The object of the present invention therefore, is to overcome the above disadvantages of the prior art in providing a safety device associated with each wheel cylinder whereby failure of the latter, or an associated line leading thereto from the master cylinder, will result in the sealing off of that particular cylinder or line before the pressure in the system drops completely and the brakes totally fail. Moreover, the safety device of the present invention includes warning means which may be positioned in full view of the driver of the automobile so that any failures in the braking system will immediately be brought to the attention of the operator of the vehicle. A further advantage of the present invention is that it will also warn a vehicle operator not only of a brake failure but of the need for adjustment of the brakes if the latter are worn to a dangerous point.

According to its broadest aspect, the present invention relates to a hydraulic braking system including a master cylinder having a primary piston mounted therein and a plurality of wheel cylinders connected to said master cylinder by brake lines; a safety mechanism comprising a plurality of casings each associated with a said brake line, each said casing having an inlet end and an outlet end; said inlet end being connected to said master cylinder and said outlet end being connected, by means of the said associated brake line, to a wheel cylinder; a secondary piston slidably mounted within each said casing and adapted to simulate movement of said primary piston; each said secondary piston having a forward end associated with the said outlet end of its casing and a rearward end associated with the inlet end of its casing, whereby, upon rupture of a brake line and a consequent pressure drop in the latter, the associated secondary piston will be caused, by residual pressure between said master cylinder and the rearward end of said associated secondary piston, to slide within its casing so that the forward end of said secondary piston will seal the outlet end of its casing thereby to retain braking pressure in the remaining lines of said system.

The invention is illustrated, by way of example, in the accompanying drawings wherein:

FIG. 1 is a schematic plan view of an automotive braking system incorporating safety mechanism of the present invention; and FIG. 2 is a sectional view, in elevation, of one of the mechanisms shown in FIG. 1.

As shown in FIG. 1, an automobile braking system, generally indicated at 1, comprises a master cylinder 2 having a primary piston (not shown) and a plurality of wheel cylinders 3 that are interconnected to the master cylinder 2 by brake lines 4. According to the present invention, a plurality of safety mechanisms 5 are inserted in the brake lines 4 between the wheel cylinders 3 and the master cylinder 2 by means of a junction box or block member 6.

One safety mechanism 5 is illustrated in cross section in FIG. 2 and it comprises a cylinder or casing 10 enclosing a slidable secondary piston 12 having O-rings 14 thereon and a conical forward end 16. Piston 12, when mounted as shown, defines an inlet chamber 11 (behind the piston) and an outlet chamber 13 (ahead of the piston). The rear portion of the cylinder 10 is sealed by a threaded cap screw or closure 18 which is interconnected to the piston 12 by means of a light spring 20 and an electric wire 22 fastened at one end to the piston 12 and at the other end to cap screw 18 by means of suitable screws 24. The casing 10 incorporates a forward bleeder valve 26 for the outlet chamber 13 and a rear bleeder valve 28 for the inlet chamber 11. Valves 26 and 28 are adapted to remove air from the casing 10 ahead of and behind piston 12.

Closure 18 is threaded as shown to receive a first junction 30 adapted to connect the cylinder 10 to a brake line 4 leading thereto from the master cylinder 2 and junction box 6 (FIG. 1). This junction 30 includes a branch line 32 and a shutoff valve 34 therein and a similar shutoff valve 36 adjacent the closure 18. Junction 30 and its branch line 32 is connected by means of a bypass line 38 to a branch 40 of a second and cruciform junction 42 threadably mounted in the forward or outlet end of the casing 10 by means of a further branch 44 that is aligned with a passage or outlet port 46 in the forward end of the casing 10. A further branch 48 leads to a wheel cylinder 3 and is connected therewith by means of a further portion of the brakeline 4.

A still further branch 50 of the cruciform junction 42 is aligned with its opposing branch 44 and the outlet port 46. Branch 50 is threaded to receive an electric switch 52 which comprises a central shaft or actuator 54 that is insulated from the cruciform junction 42 by means of fiber 56. As shown, the actuator 54 extends into the confines of branch 44 to terminate in the outlet port 46 in the form of a coil spring 58. It is shown schematically that the other or outer end of shaft 54 provides an electrical terminal 60 which is connected to one side of a warning light 62 that may be mounted in the control panel of the automobile in full view of the operator thereof. The warning light 62 may derive its illuminating source from the automobile battery 64 in any known manner.

Preferably, the safety mechanism above-described is to be mounted in a brake line associated with each wheel cylinder 3. However, one casing 10 could be connected to the two front cylinders 3 and a further casing 10 could be connected to the rear-wheel cylinder 3. In any case, casing 10 is provided with flanges 66 on its lower end so as to be suitably mounted to the framework of the automobile. Now in installing the mechanism of the present invention in a known hydraulic system, the assembly shown in FIG. 2 is connected in the brake line 4 by means of the first junction 30 and the branch 48 of the second junction 42. Valve 36 is closed to shut off flow of hydraulic fluid from the master cylinder 2 (FIG. 1) into the inlet chamber 11 of the casing 10 and the valve 34 in the branch 32 is opened. Hydraulic fluid is then pumped from the master cylinder 2 to the wheel cylinders 3 through the junction 30, bypass line 38, cruciform junction 42 and brake line 4. At the same time, of course, fluid flows into the outlet chamber 13 of the casing 10 by means of the branch 44 of the cruciform 42 and the outlet port 46. Air in the casing 10, adjacent the conical end 16 of the piston 12, is bled off by means of the bleeding valve 26. Valve 34 in the junction 30 is now closed and locked and valve 36 is opened so as to allow passage of hydraulic fluid from the master cylinder 2 through the brake line 4, closure 18 into the inlet chamber 11 of the casing 10 behind the piston 12 and air is bled away from this portion of the casing 10 by means of the bleeding valve 28. The safety mechanism is now operatively connected in the braking system.

The brake system, in effect, now includes the master cylinder 2 having its primary piston (not shown) operated by the brake pedal of the vehicle together with a secondary piston 12 in each brake line 4 whereby application of the brake pedal (not shown) forces fluid via the line 4 against the rearward portion of piston 12 which simulates movement of the primary piston and wheel cylinder pistons and thereby transmits the braking force to the fluid ahead of the piston and into the wheel cylinders 3. Now when the brake linings of the system become worn after prolonged use and adjustment of the system should be made, a full brake application will naturally cause piston 12 to move farther forward than normal into the outlet chamber 13 and the conical end 16 will momentarily contact the end of spring 58 of the actuator 54 of the switch 52. This will illuminate warning light 62 due to the fact that piston 12 is grounded to the frame of the automobile through the intermediary of the electrical wire 22, closure 18 and cylinder mountings 66. In the case of a brake line rupture or the fracturing of a wheel cylinder 3 or one of its component parts, a pressure drop will occur in the outlet chamber 13 and a brake application will cause the conical end 16 of piston 12 to be thrust into the outlet port 46 in the forward end of the casing 10 thereby closing off its associated brake line 4. Warning light 62, associated with that particular brake line, will be illuminated and piston 12 will remain in its shutoff position due to the fact that there is now no pressure in the line forward of the piston but the residual line pressure is still present in the line and inlet port 11 behind the piston 12. The remaining brake lines will, of course, be in effect and will remain operative until such time as the rupture or line failure can be repaired.

I claim:

In a vehicular hydraulic braking system having a master cylinder and primary piston therein and a plurality of wheel cylinders connected to said master cylinder by brake lines, a safety mechanism comprising a casing inserted in each of said brake lines between each wheel cylinder and said master cylinder; each said casing including (a) a cylindrical bore;
(b) an inlet port and an outlet port concentric with the ends of said bore;
(c) a single secondary piston slidably mounted in said bore in alignment with and between said inlet and outlet ports, said secondary piston including sealing rings thereon and defining inlet and outlet chambers adjacent each end thereof in said bore; said secondary piston being movable by hydraulic fluid in said line and being responsive to, and adapted to simulate movement of, said primary piston and said wheel cylinder;
(d) a first junction on said casing adapted to connect said inlet port and inlet chamber to said master cylinder; and including a closure plug threadably engaging one end of the bore in said casing and being connected to said secondary piston by spring means;
(e) a second junction on said casing adapted to connect said outlet port and outlet chamber to said wheel cylinder;
(f) a by-pass line connecting said first and second junctions;
(g) valve means in said first junction adapted to close said inlet port whereby hydraulic fluid from said master cylinder may be diverted through said by-pass line and second junction for filling said line and said outlet chamber during installation of said casing in said braking system;
(h) valve means in said first junction for closing said by-pass line;
(i) bleed valves in said outlet and inlet chambers for removing air from said casing; and
(j) a brake wear and failure indicating switch mounted in said second junction remote from said casing and having an actuator concentric with and extending into said outlet port so as to be contacted by one end of said secondary piston, said switch having an associated light for indicating said contact; said secondary piston having a conical forward end adapted to proceed farther into said outlet chamber and into said outlet port in response to increased wear of said braking system so as to effect said switch contact; said secondary piston being further adapted, upon rupture of an associated brake line and a consequent drop of fluid pressure in said outlet chamber, to slide forward in said casing and seal said outlet port.

References Cited by the Examiner

UNITED STATES PATENTS

| 1,831,081 | 11/31 | Smith | 303—84 |
| 2,053,557 | 9/36 | Hess et al. | 303—84 |
| 2,093,015 | 9/37 | Madden | 303—84 |
| 2,484,177 | 10/49 | Mapes et al. | 303—84 |
| 2,774,958 | 12/56 | Aldasoro | 60—54.6 X |
| 2,824,627 | 2/58 | Winter | 188—151.11 |

FOREIGN PATENTS 486,512   9/36   Great Britain.

JULIUS E. WEST, Primary Examiner.

ROBERT R. BUNEVICH, Examiner.